R. W. NELSON.
CAR-AXLE.

No. 180,494. Patented Aug. 1, 1876.

WITNESSES:
Chas. Nida.
John Goethals

INVENTOR:
R. W. Nelson
BY
ATTORNEYS.

UNITED STATES PATENT OFFICE.

ROBERT W. NELSON, OF CHARLOTTESVILLE, VIRGINIA.

IMPROVEMENT IN CAR-AXLES.

Specification forming part of Letters Patent No. 180,494, dated August 1, 1876; application filed May 16, 1876.

*To all whom it may concern:*

Figure 1:
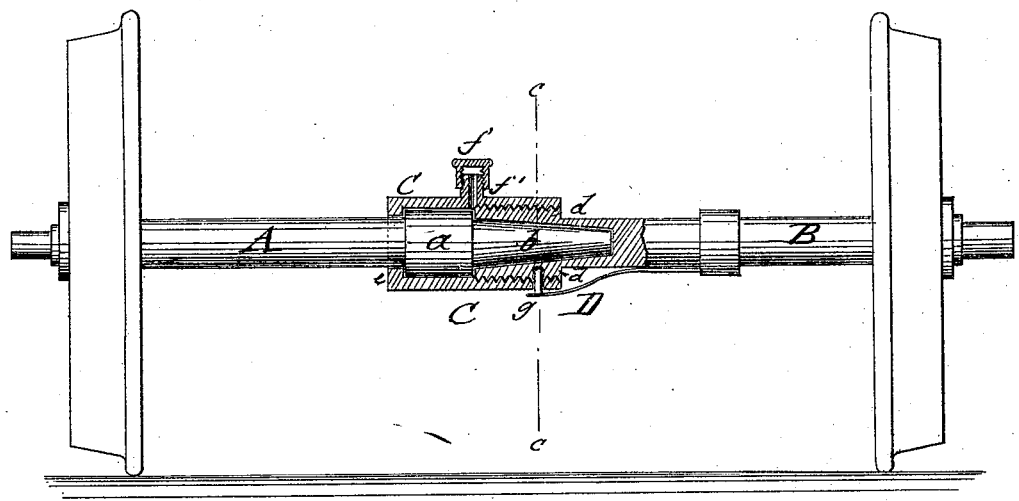
Figure 2:
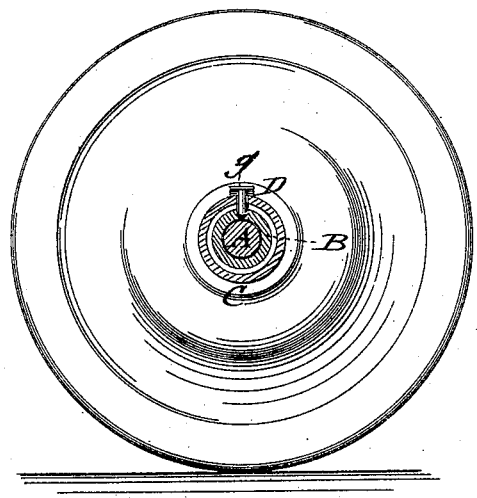

Be it known that I, ROBERT WILLIAM NELSON, of Charlottesville, Albemarle county, State of Virginia, have invented a new and Improved Car-Axle, of which the following is a specification:

In the accompanying drawing, Figure 1 represents a sectional side elevation of my improved car-axle, and Fig. 2 is a vertical transverse section of the same on line C C, Fig. 1.

Similar letters of reference indicate corresponding parts.

My invention is mainly designed to admit the free and easy motion of each wheel of a car-axle independently of the other, so as to diminish the friction of the wheels on the rails, avoid the slipping of the same in turning curves, reduce the danger of accidents, and admit of greater speed in passing curves.

The invention will first be described in connection with the drawing, and then pointed out in the claim.

In the drawing, A and B represent the sections of my improved car-axle, which are jointed about midway between the wheels. The axle-section A has a collar or shoulder, $a$, and a conically-tapering journal, $b$, that enters and revolves in a corresponding bearing of the section B. The section B is also provided with a collar or shoulder, $d$, of the same diameter as collar $a$, but screw-threaded to admit the screwing on of the jointing-sleeve C, that forms the connection of the axle-sections. The screw-sleeve C is loosely placed on section $a$, and bears, by a flange, $e$, at the smooth end of the sleeve C, against the collar $a$ of section A. The sleeve C is provided with an oil-cup, $f$, that opens by a capillary oil-duct or channel, $f'$, just above the junction of the axle-sections. In place of the capillary tubes a larger opening may be made, and fitted with a cotton wick, by which the oil is, in similar manner, slowly, but continuously, fed to the jointed part of the axle-sections for lubricating the same. A spring, D, attached to section B forces a small lock-pin, $g$, into socket-holes of the sleeve C and section B, so as to keep the sleeve more firmly in place, and prevent any screwing off by friction with section A. By withdrawing the spring from the sleeve the same may be unscrewed, and thereby the axle-sections separated.

The conical journal and bearing of the axle-sections are devised for the purpose of enabling even a small quantity of oil that is fed from the oil-cup to pass freely down to the end or point up the cone, and lubricate thereby the whole axle-joint in a more advantageous manner than with a cylindrical or other connection.

The wear is made even throughout the length of the conical parts, and greater strength attained in the section bored out than by any other form of sectional axle.

I am aware that car-axles have been made with two cylindrical bearings, connected by an intermediate tapered part, in order that said axles may be adjusted to different road-gages; but my bearing is not double or changeable, but is wholly upon the taper, and extends along the entire length thereof.

Hence what I claim is—

A car-axle made in two sections, one having a conical socket that receives the journal of the other, and affords it a bearing along its whole surface, as shown and described.

ROBERT WILLIAM NELSON.

Witnesses:
R. W. BAILEY,
J. D. GOODMAN.